US012194489B1

(12) United States Patent
Soldati et al.

(10) Patent No.: US 12,194,489 B1
(45) Date of Patent: Jan. 14, 2025

(54) ADHESIVE DISPENSING ASSEMBLY

(71) Applicant: THE CLAW LLC, Peru, IL (US)

(72) Inventors: Devin Soldati, Arlington, IL (US); Matthew Herbert Klein, Peru, IL (US)

(73) Assignee: THE CLAW LLC, Peru, IL (US)

( * ) Notice: Subject to any disclaimer, the term of this patent is extended or adjusted under 35 U.S.C. 154(b) by 99 days.

(21) Appl. No.: 18/137,641

(22) Filed: Apr. 21, 2023

Related U.S. Application Data

(60) Provisional application No. 63/334,158, filed on Apr. 24, 2022.

(51) Int. Cl.
*B05C 17/01* (2006.01)

(52) U.S. Cl.
CPC ................................ *B05C 17/0133* (2013.01)

(58) Field of Classification Search
CPC .... B05C 17/0133; B65D 35/28; B65D 35/30; B65D 35/34; B65D 45/02; B65D 35/56; B65D 77/06; B65D 81/3233; B65D 83/0072
See application file for complete search history.

(56) References Cited

U.S. PATENT DOCUMENTS

| | | | | | |
|---|---|---|---|---|---|
| 2,421,711 | A * | 6/1947 | Moots | B05C 17/0133 | 222/327 |
| 2,913,151 | A * | 11/1959 | Wiseman | B05C 17/00596 | 222/323 |
| 3,774,819 | A * | 11/1973 | Bratton | G01F 11/022 | 222/391 |
| 3,861,567 | A * | 1/1975 | Davis, Jr. | B05C 17/0103 | D8/14.1 |
| 3,913,799 | A * | 10/1975 | Davis, Jr. | B05C 17/0103 | 222/326 |
| 4,253,589 | A * | 3/1981 | Kiste, Jr. | B05C 17/0133 | 74/424.78 |
| 4,485,944 | A * | 12/1984 | Eichholz | B05C 17/0133 | 411/433 |

* cited by examiner

*Primary Examiner* — Donnell A Long
(74) *Attorney, Agent, or Firm* — Reising Ethington PC

(57) ABSTRACT

An adhesive dispensing assembly for holding an adhesive holding cartridge therein is provided. The assembly includes a U-shaped frame and a screw receiving portion that is coupled to a first end portion of the U-shaped frame. The screw receiving portion has a threaded aperture extending therethrough. The assembly includes a cartridge holding portion that is coupled to a second end portion of the U-shaped frame. The cartridge holding portion has a tubular wall and a ring-shaped wall coupled to an end of the tubular wall. The assembly includes a screw member threadably received through the threaded aperture. The assembly includes a plunger pad that is coupled to the screw member. The assembly includes a handle that is coupled to screw member, and a bolt head that is coupled to the screw member.

17 Claims, 15 Drawing Sheets

ADHESIVE DISPENSING ASSEMBLY

CROSS-REFERENCE TO RELATED APPLICATIONS

This application claims priority to U.S. Provisional Patent Application No. 63/334,158 filed on Apr. 24, 2022, the entire contents of which are hereby incorporated by reference herein.

BACKGROUND

An anchoring adhesive is necessary to secure heavy machinery to masonry. However, the anchoring adhesive is exceedingly difficult to dispense, especially in cold temperatures. The anchoring adhesive has a high viscous level and known dispensing guns either cannot handle the required dispensing pressure and will break, or the dispensing task causes excessive fatigue in a user. Current dispensing guns also require awkward positions of the wrist and undesirable forceful and repetitive contractions of the finger and wrist flexors. The wrist and hand have been reported to have the second-highest prevalence of musculoskeletal disorders in construction workers, partially due to years of having to work with ineffective dispensing guns.

The inventors herein have recognized a need for an improved adhesive dispensing assembly that minimizes and/or reduces the above-mentioned problems.

SUMMARY

An adhesive dispensing assembly for holding an adhesive holding cartridge therein in accordance with an exemplary embodiment is provided. The adhesive dispensing assembly includes a U-shaped frame having a first end portion and a second end portion. The adhesive dispensing assembly further includes a screw receiving portion that is coupled to the first end portion of the U-shaped frame. The screw receiving portion has a threaded aperture extending therethrough. The adhesive dispensing assembly further includes a cartridge holding portion that is coupled to the second end portion of the U-shaped frame. The cartridge holding portion has a tubular wall and a ring-shaped wall. The tubular wall has a first end, a second end, and a groove extending through the tubular wall from the first end toward the second end. The ring-shaped wall is coupled to the second end of the tubular wall. The first end defines a receiving aperture. The adhesive dispensing assembly further includes a screw member having a first end portion, a central portion, and a second end portion. The central portion is coupled to and between the first and second end portions of the screw member. The central portion is threadably received through the threaded aperture of the screw receiving portion. The adhesive dispensing assembly further includes a plunger pad that is coupled to the second end portion of the screw member. The adhesive dispensing assembly further includes a handle that is coupled to the first end portion of the screw member. The adhesive dispensing assembly further includes a bolt head that is coupled to an end of the first end portion of the screw member.

An adhesive dispensing assembly for holding an adhesive holding cartridge therein in accordance with another exemplary embodiment is provided. The adhesive dispensing assembly includes a U-shaped frame having a first end portion and a second end portion. The adhesive dispensing assembly further includes a screw receiving portion being coupled to the first end portion of the U-shaped frame. The screw receiving portion has a threaded aperture extending therethrough. The adhesive dispensing assembly further includes a cartridge holding portion that is coupled to the second end portion of the U-shaped frame. The cartridge holding portion has a tubular wall and a ring-shaped wall. The tubular wall has a first end, a second end, and a groove extending through the tubular wall from the first end toward the second end. The ring-shaped wall is coupled to the second end of the tubular wall. The first end defines a receiving aperture. The adhesive dispensing assembly further includes a screw member having a first end portion, a central portion, and a second end portion. The central portion is coupled to and between the first and second end portions of the screw member. The central portion is threadably received through the threaded aperture of the screw receiving portion. The adhesive dispensing assembly further includes a plunger pad that is coupled to the second end portion of the screw member. The adhesive dispensing assembly further includes a handle that is coupled to the first end portion of the screw member.

An adhesive dispensing assembly for holding an adhesive holding cartridge therein in accordance with another exemplary embodiment is provided. The adhesive dispensing assembly includes a U-shaped frame having a first end portion and a second end portion. The adhesive dispensing assembly further includes a screw receiving portion that is coupled to the first end portion of the U-shaped frame. The screw receiving portion has a threaded aperture extending therethrough. The adhesive dispensing assembly further includes a cartridge holding portion that is coupled to the second end portion of the U-shaped frame. The cartridge holding portion has a tubular wall and a ring-shaped wall. The tubular wall has a first end, a second end, and a groove extending through the tubular wall from the first end toward the second end. The ring-shaped wall is coupled to the second end of the tubular wall. The first end defines a receiving aperture. The adhesive dispensing assembly further includes a screw member having a first end portion, a central portion, and a second end portion. The central portion is coupled to and between the first and second end portions of the screw member. The central portion is threadably received through the threaded aperture of the screw receiving portion. The adhesive dispensing assembly further includes a plunger pad that is coupled to the second end portion of the screw member. The adhesive dispensing assembly further includes a bolt head that is coupled to an end of the first end portion of the screw member.

DETAILED DESCRIPTION

Figure 1:
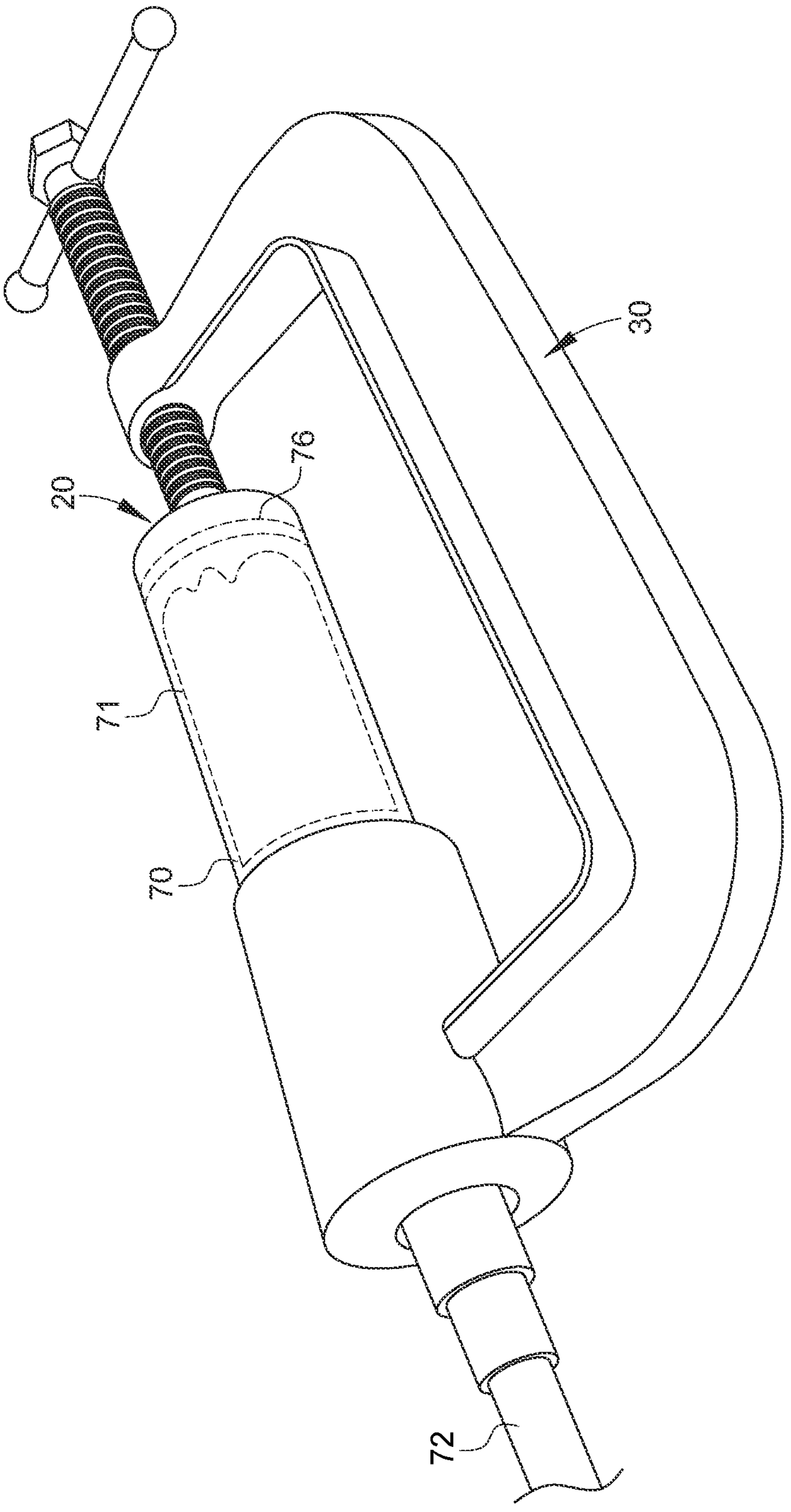
FIG. 1 is a schematic of an adhesive holding cartridge, and an adhesive dispensing assembly in accordance with an exemplary embodiment.
Figure 2:
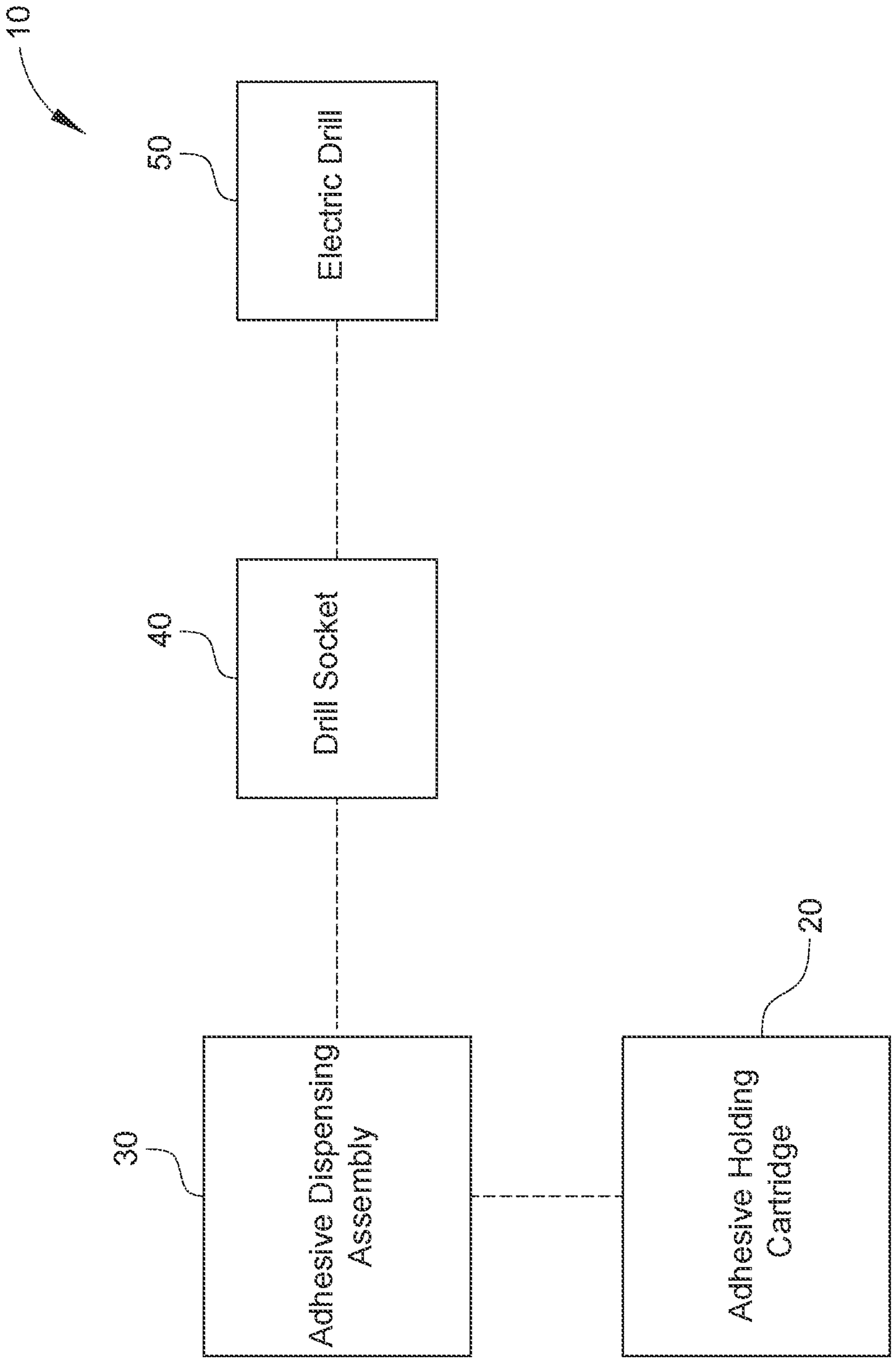
FIG. 2 is a block diagram of a system for dispensing adhesive utilizing the adhesive holding cartridge, the adhesive dispensing assembly of FIG. 1, a drill socket, and an electric drill.

Referring to FIGS. 1 and 2, a system 10 for dispensing an adhesive 71 is illustrated. The system 10 includes an adhesive holding cartridge 20, an adhesive dispensing assembly 30 in accordance with an exemplary embodiment, a drill socket 40, and an electric drill 50.

Referring to FIG. 1, the adhesive holding cartridge 20 includes a cartridge body 70 holding an adhesive 71 therein, a dispensing tip 72 coupled to the cartridge body 70, and a slidable inner cap 76 disposed in the cartridge body 70 that communicates with the adhesive 71.

Referring to FIGS. 3-13, the adhesive dispensing assembly 30 is provided to dispense the adhesive 71 from the cartridge body 70 of the adhesive holding cartridge 20. The adhesive dispensing assembly 30 includes a U-shaped frame 100, a screw receiving portion 102, a cartridge holding portion 104, a screw member 106, a plunger pad 108, a handle 110, and a bolt head 112.

Figure 5:
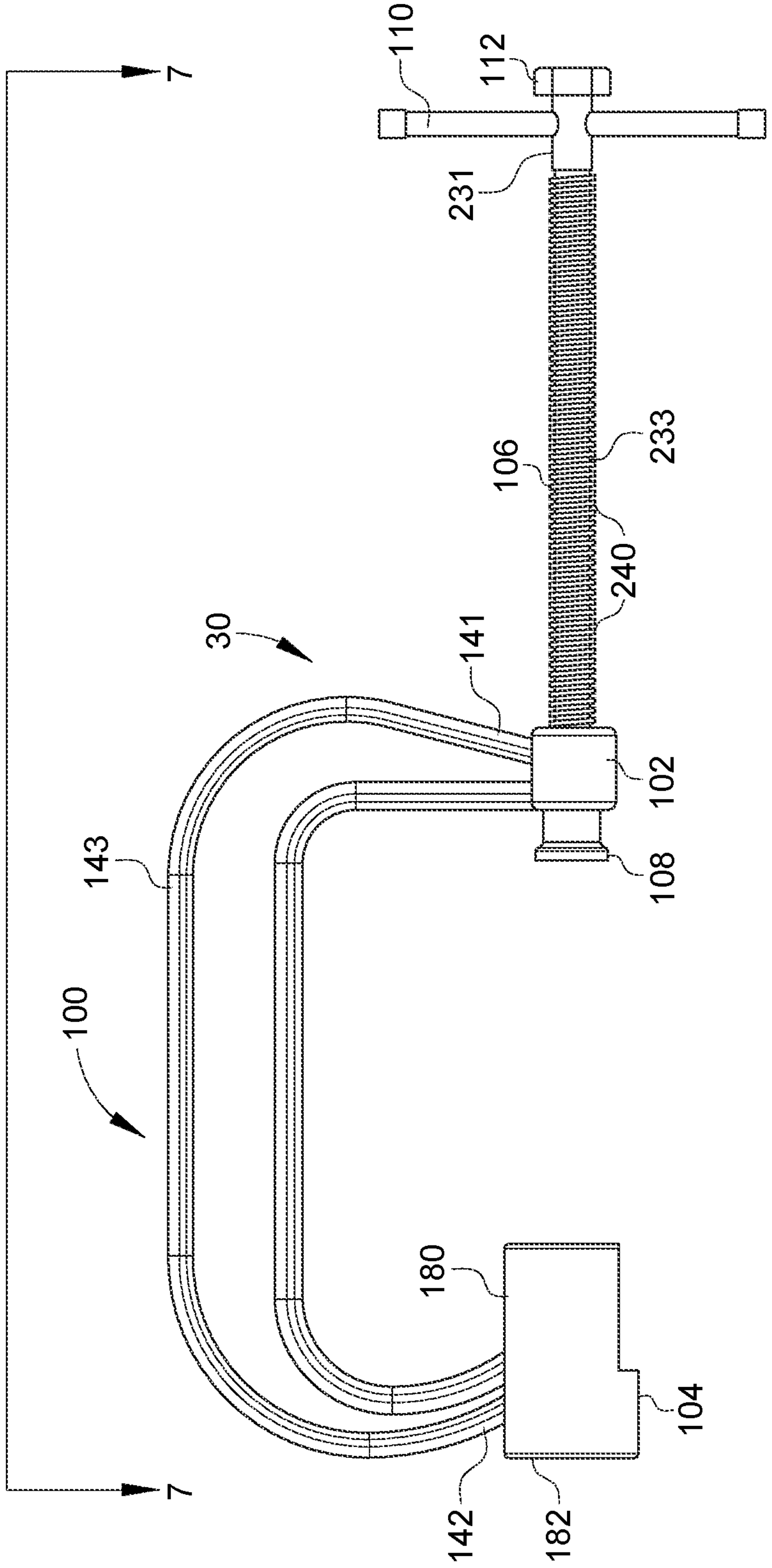
FIG. 5 is a side view of the adhesive dispensing assembly of FIG. 3.
Figure 6:
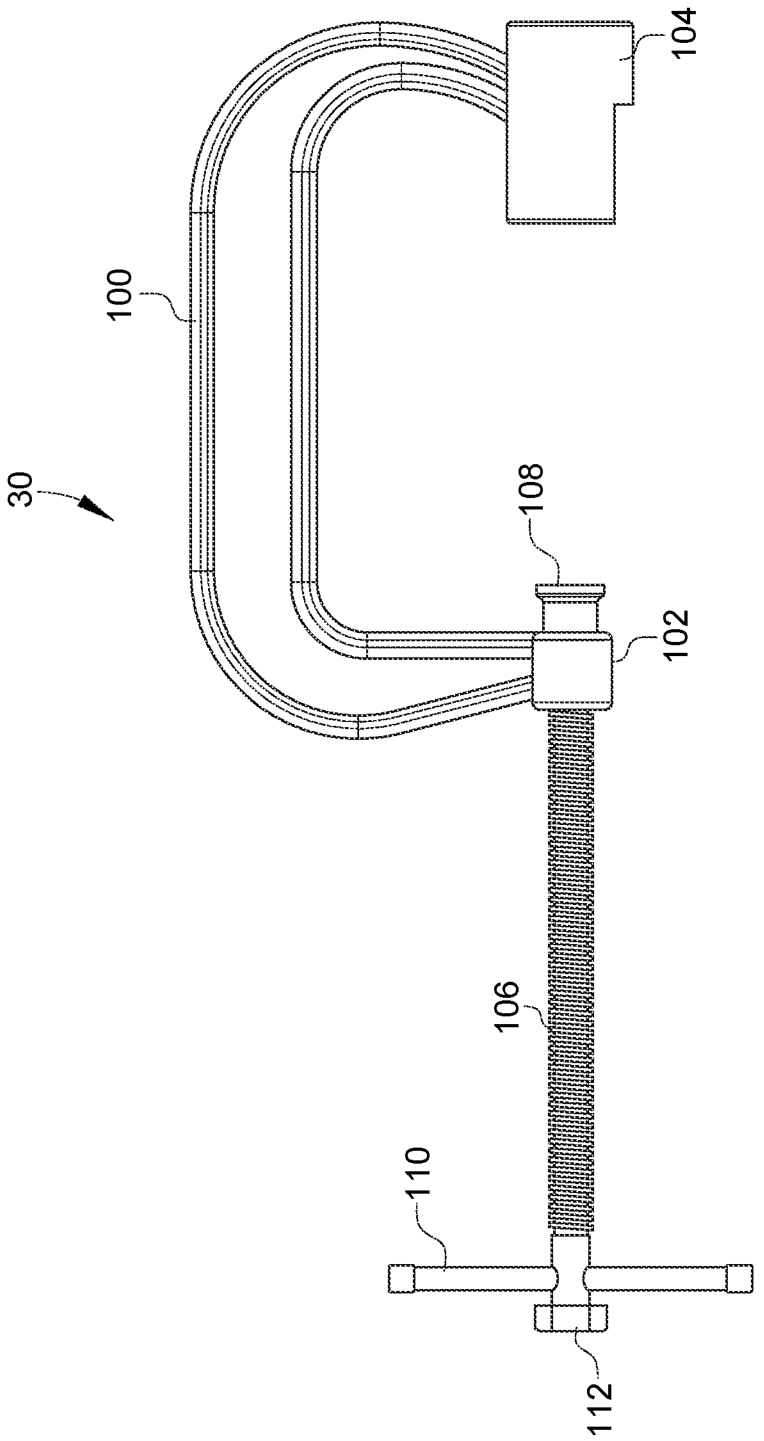
FIG. 6 is another side view of the adhesive dispensing assembly of FIG. 3.

Referring to FIG. 5, the U-shaped frame 100 has a first end portion 141, a second end portion 142, and a center portion 143. The center portion 143 is coupled to and between the first and second end portions 141, 142 and extends generally perpendicular to the first and second end portions 141, 142. In an exemplary embodiment, the U-shaped frame 100 is constructed of a metal.

Figure 7:
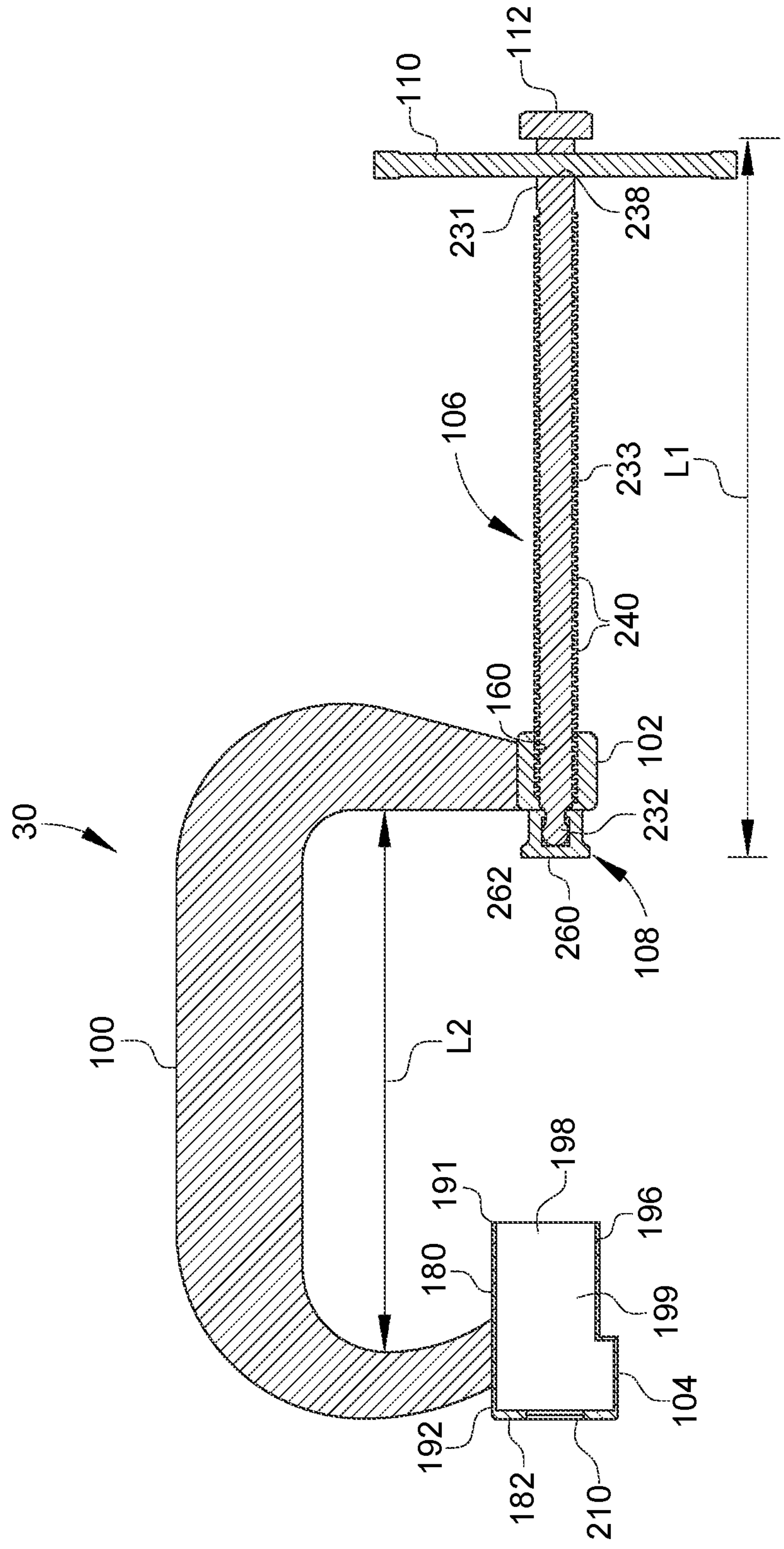
FIG. 7 is a cross-sectional view of the adhesive dispensing assembly of FIG. 5 taken along lines 7-7.
Figure 8:
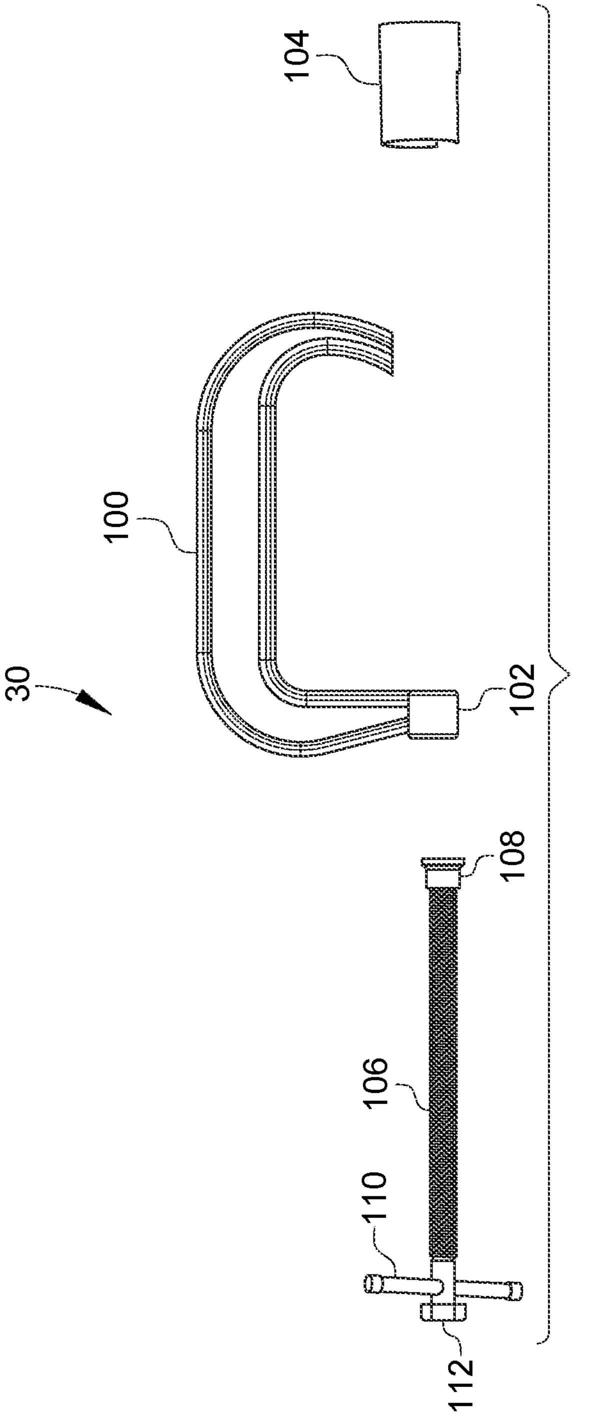
FIG. 8 is an exploded view of the adhesive dispensing assembly of FIG. 3.
Figure 9:
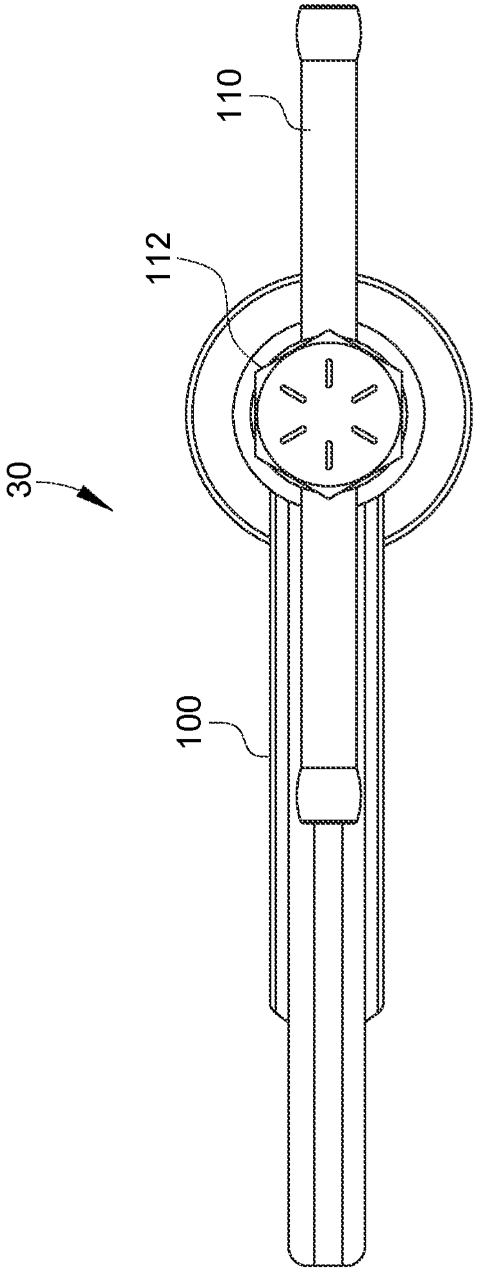
FIG. 9 is a rear view of the adhesive dispensing assembly of FIG. 3.
Figure 10:
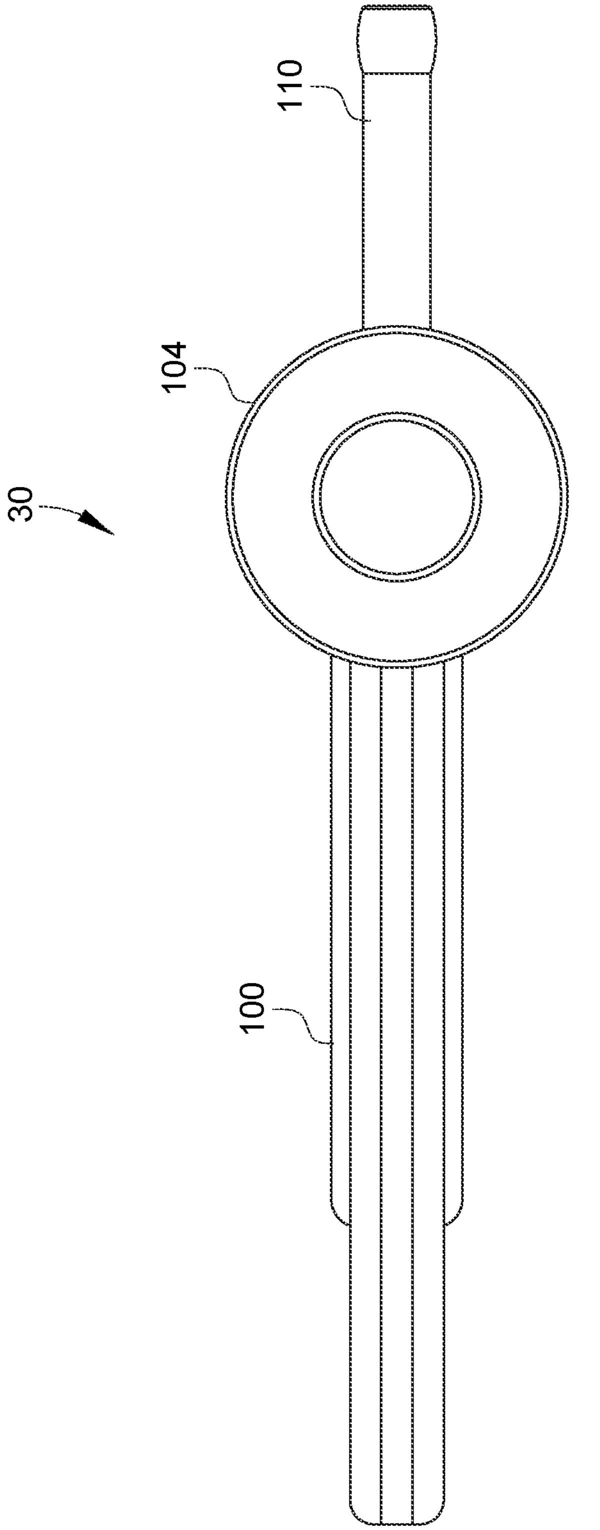
FIG. 10 is a front view of the adhesive dispensing assembly of FIG. 3.

Referring to FIG. 7, the screw receiving portion 102 is coupled to the first end portion 141 of the U-shaped frame 100. The screw receiving portion 102 has a threaded aperture 160 extending therethrough. In an exemplary embodiment, the screw receiving portion 102 is constructed of a metal.

Figure 11:
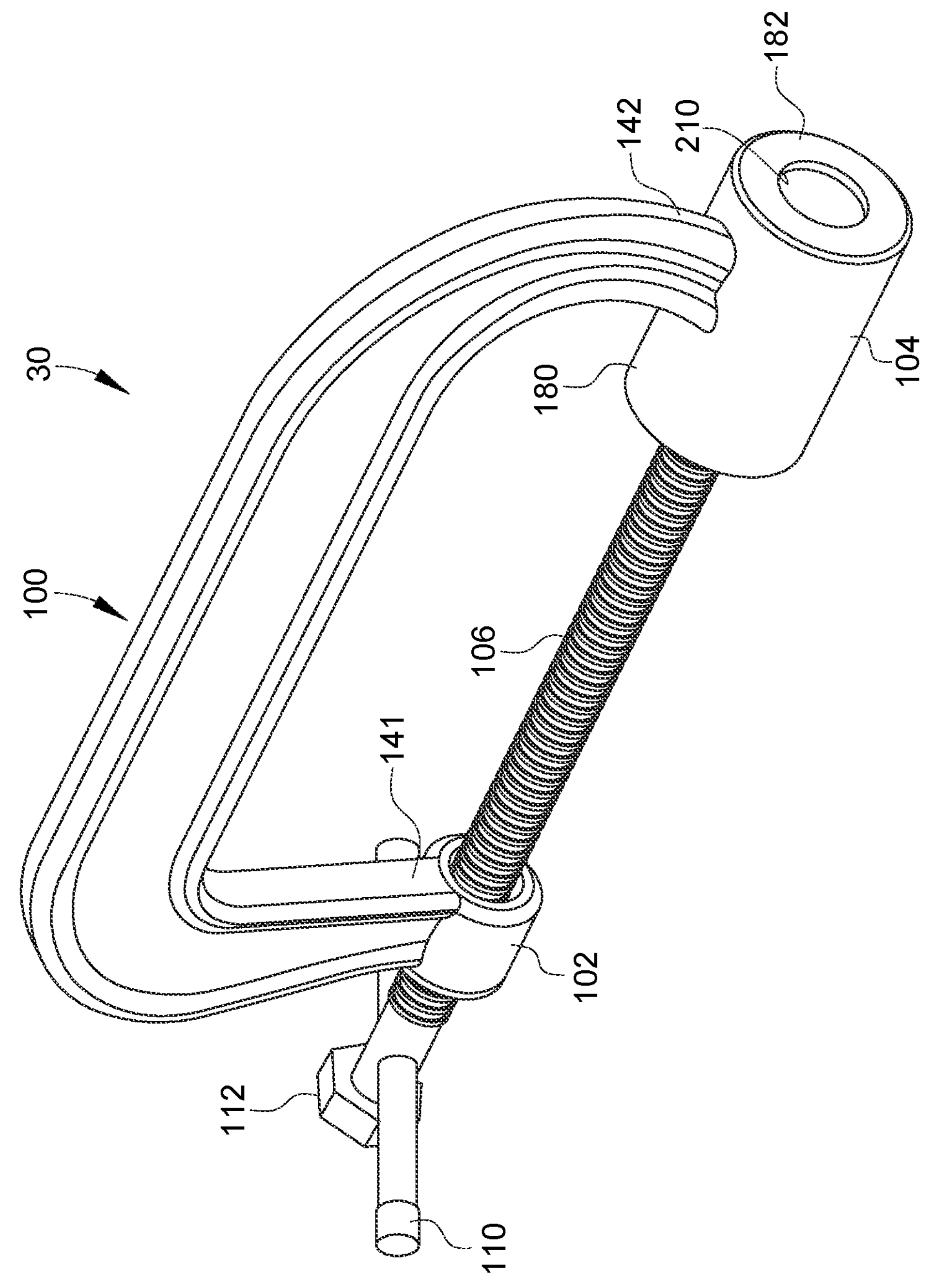
FIG. 11 is another isometric view of the adhesive dispensing assembly of FIG. 3.
Figure 12:
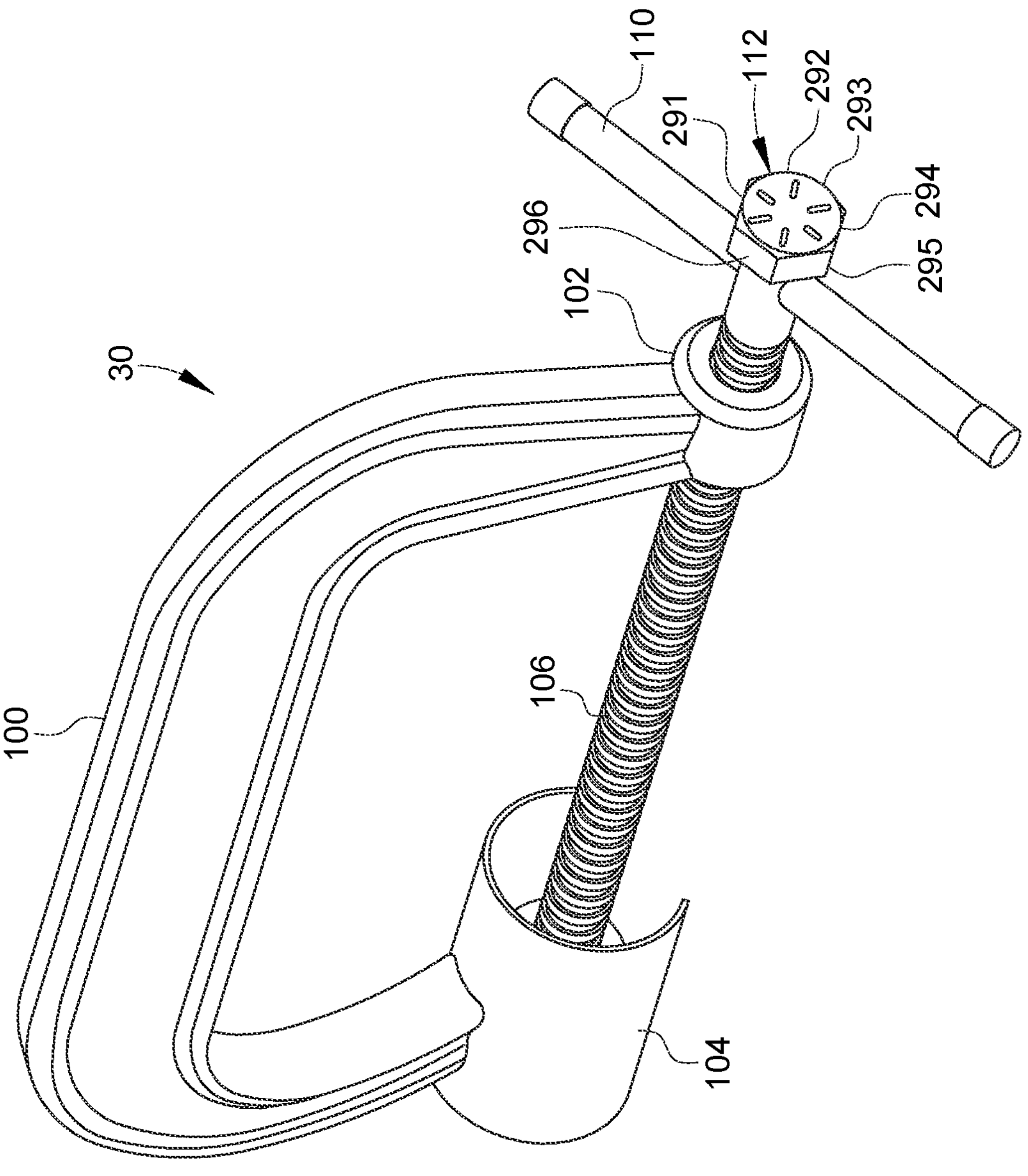
FIG. 12 is another isometric view of the adhesive dispensing assembly of FIG. 3.
Figure 13:
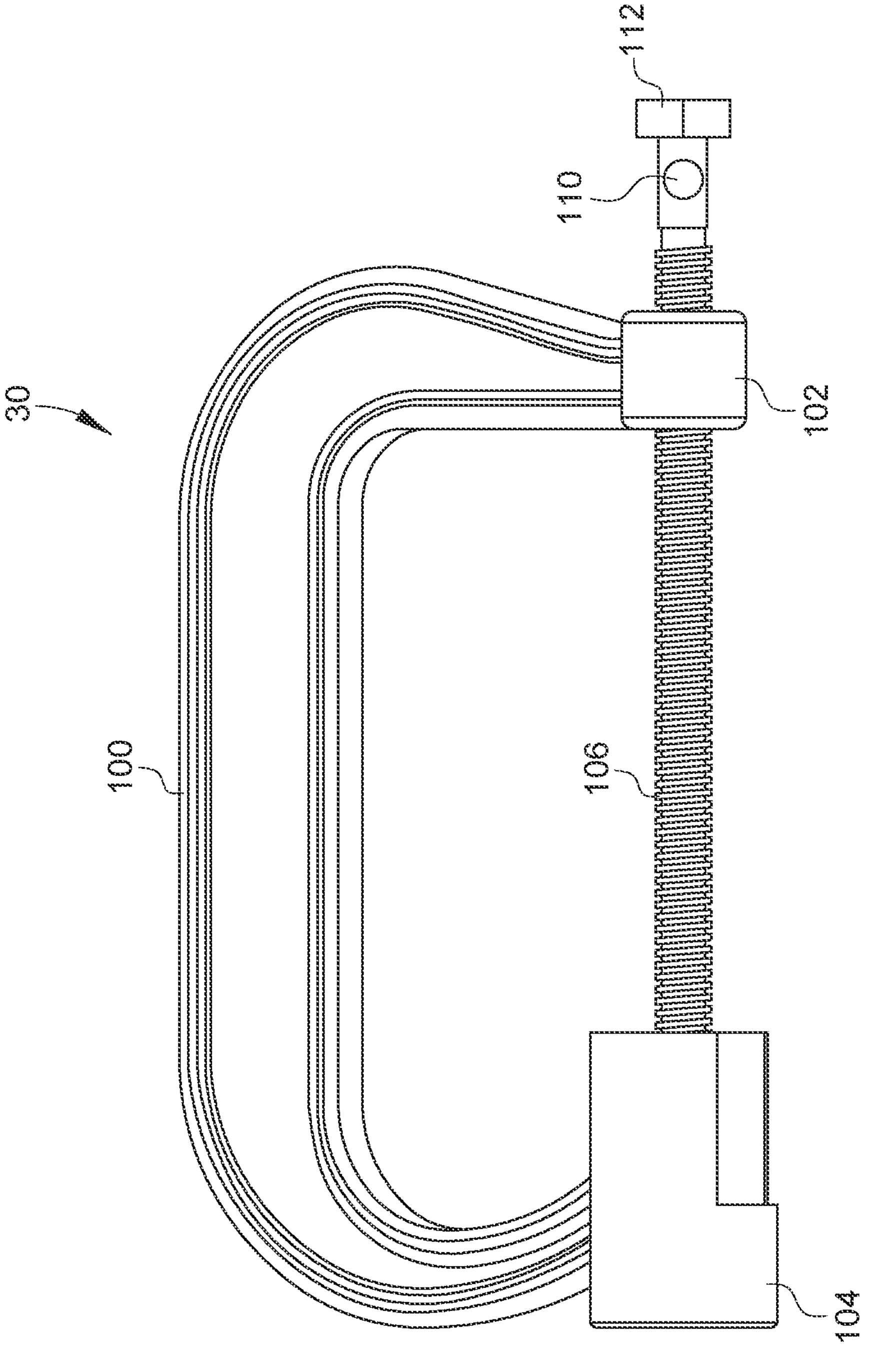
FIG. 13 is a side view of the adhesive dispensing assembly of FIG. 12.
Figure 14:
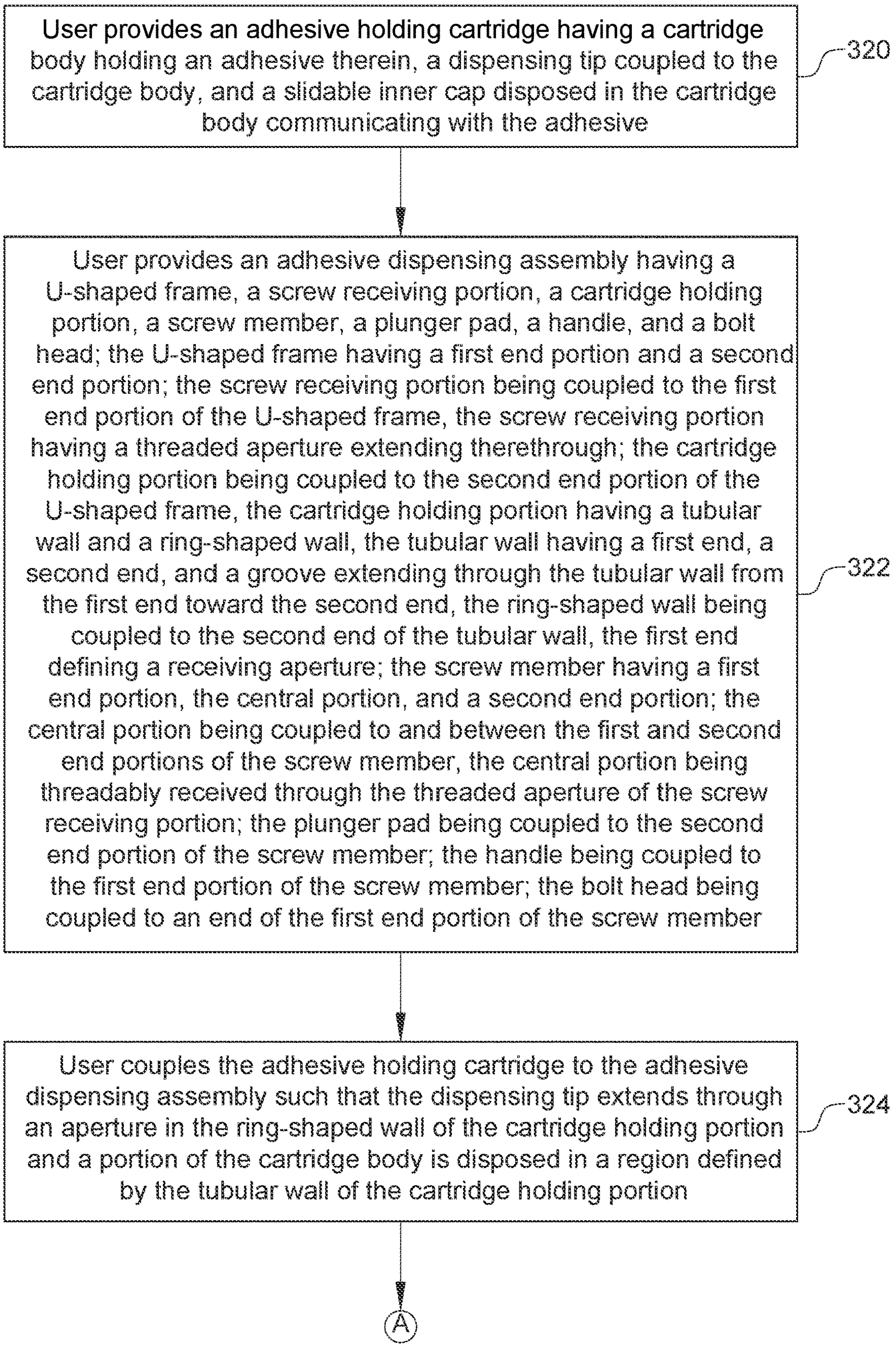
FIGS. 14-15 are flowcharts of a method for dispensing adhesive utilizing the adhesive dispensing assembly in accordance with another exemplary embodiment.
Figure 15:
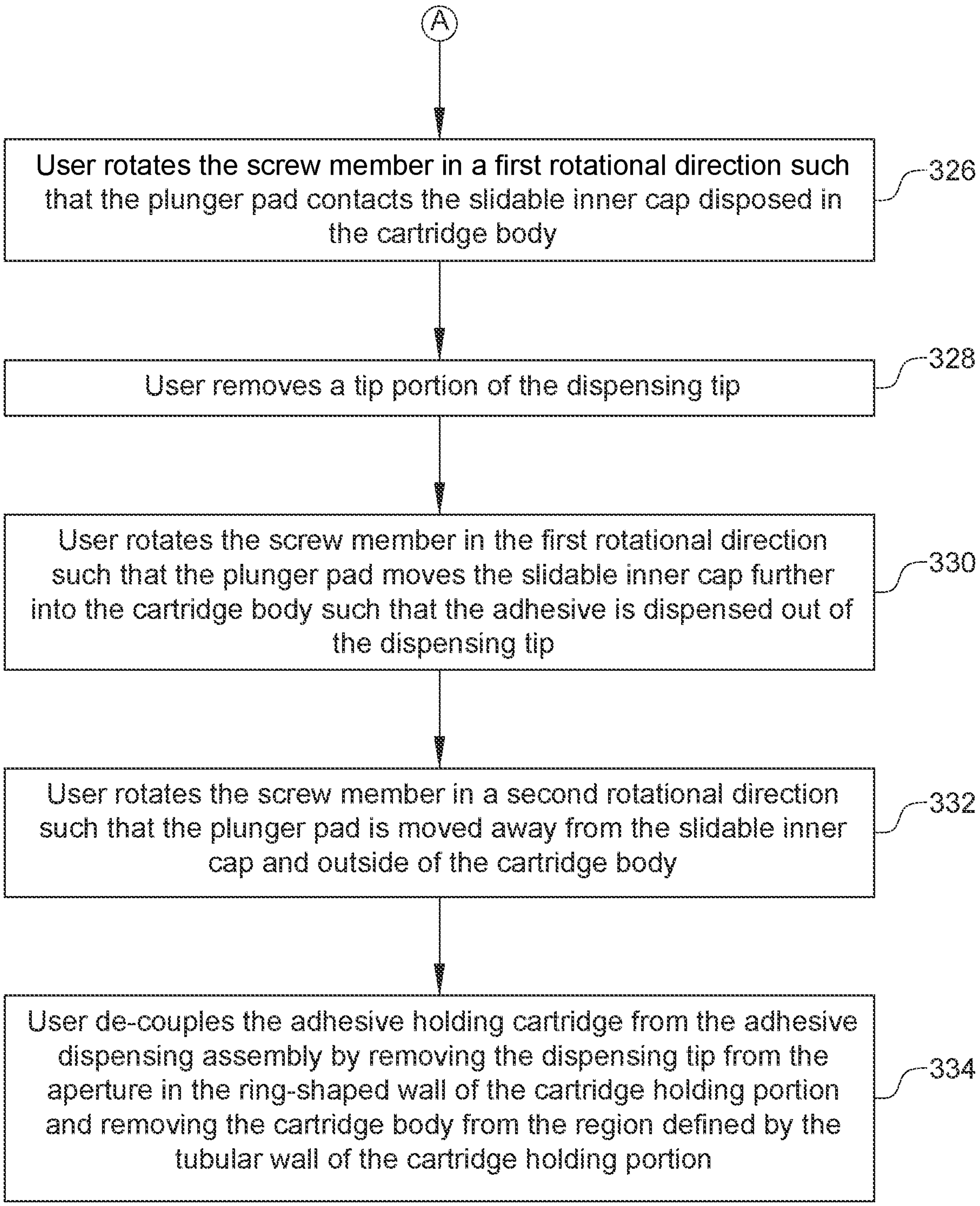

Referring to FIGS. 1, 7 and 11, the cartridge holding portion 104 is coupled to the second end portion 142 of the U-shaped frame 100. The cartridge holding portion 104 has a tubular wall 180 and a ring-shaped wall 182. The tubular wall 180 has a first end 191, a second end 192, and a groove 196 extending through the tubular wall 180 from the first end 191 toward the second end 192. The ring-shaped wall 182 is coupled to the second end 192 of the tubular wall 180. The ring-shaped wall 182 has an aperture 210 extending therethrough that receives the dispensing tip 72 (shown in FIG. 1) therethrough. The first end 191 defines a receiving aperture 198 for receiving the dispensing tip 72 and a portion of the cartridge body 70 therethrough. A diameter of the tubular wall 180 is greater than a diameter of the adhesive holding cartridge 20. In an exemplary embodiment, the cartridge holding portion 104 is constructed of a metal.

Referring to FIGS. 1, 5 and 7, the screw member 106 is provided to rotate in a first rotational direction to move the plunger pad 108 against the slidable inner cap 76 (shown in FIG. 1) of the adhesive holding cartridge 20 and to further move the slidable inner cap 76 inwardly into the cartridge body 70 to urge the adhesive 71 out of the dispensing tip 72. The screw member 106 is further provided to rotate in the second rotational direction to move the plunger pad 108 away from the slidable inner cap 76. The screw member 106 has a first end portion 231, a second end portion 232, and a central portion 233. The central portion 233 is coupled to and between the first and second end portions 231, 232 of the screw member 106. The central portion 233 has a plurality of threads 240 that are threadably received through the threaded aperture 160 of the screw receiving portion 102. A length L1 of the screw member 106 is greater than a length of a throat distance L2 of the U-shaped frame 100. In an exemplary embodiment, the screw member 106 is constructed of a metal.

Referring to FIG. 7, the plunger pad 108 is rotatably coupled to the second end portion 232 of the screw member 106. The plunger pad 108 has a contact surface 260, and a receiving aperture 262 extending therein. The second end portion 232 of the screw member 106 is a ball portion that is disposed in the receiving aperture 262 of the plunger pad 108. In an exemplary embodiment, the plunger pad 108 is constructed of a metal.

Figure 3:
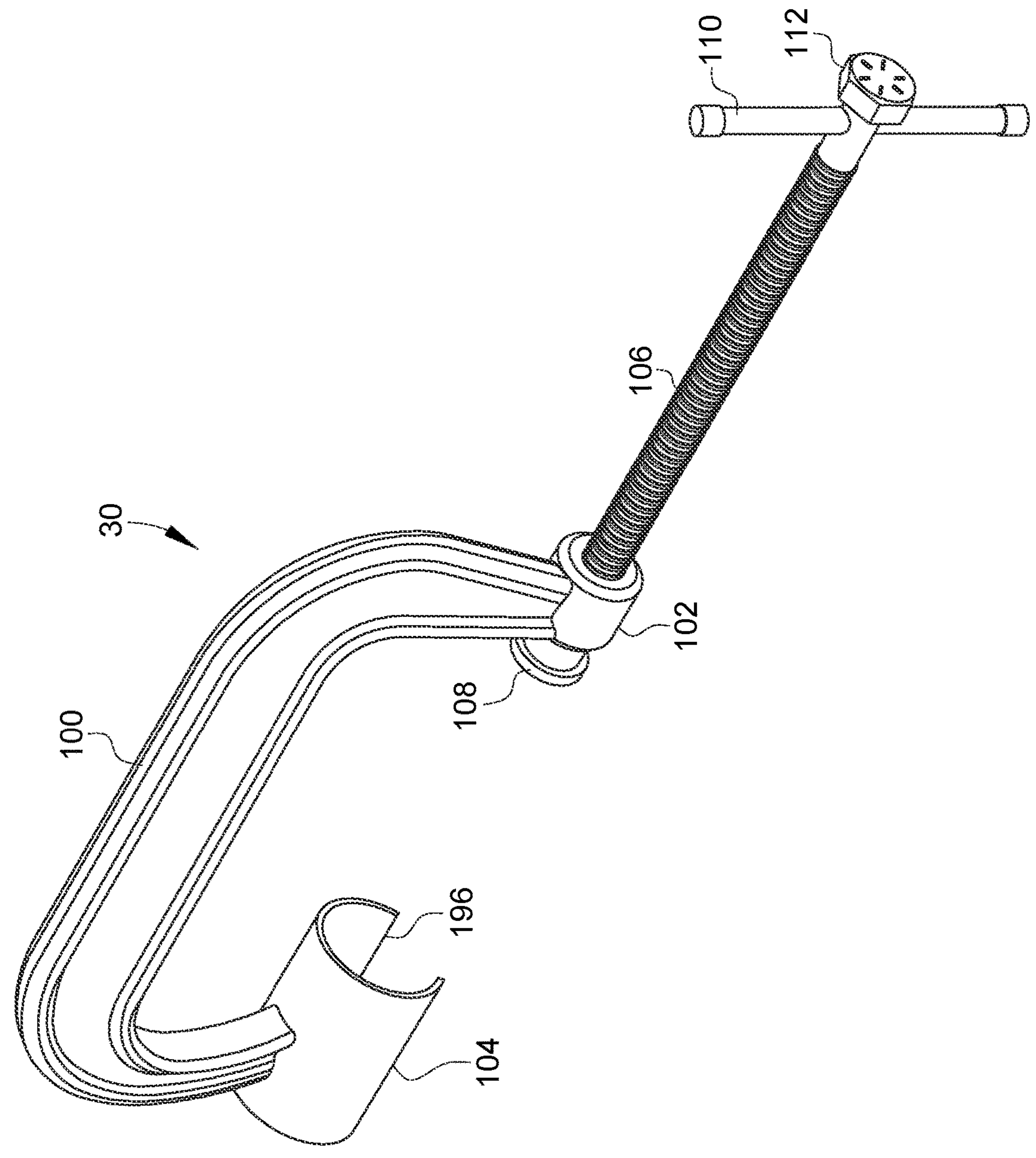
FIG. 3 is an isometric view of the adhesive dispensing assembly of FIG. 1.
Figure 4:
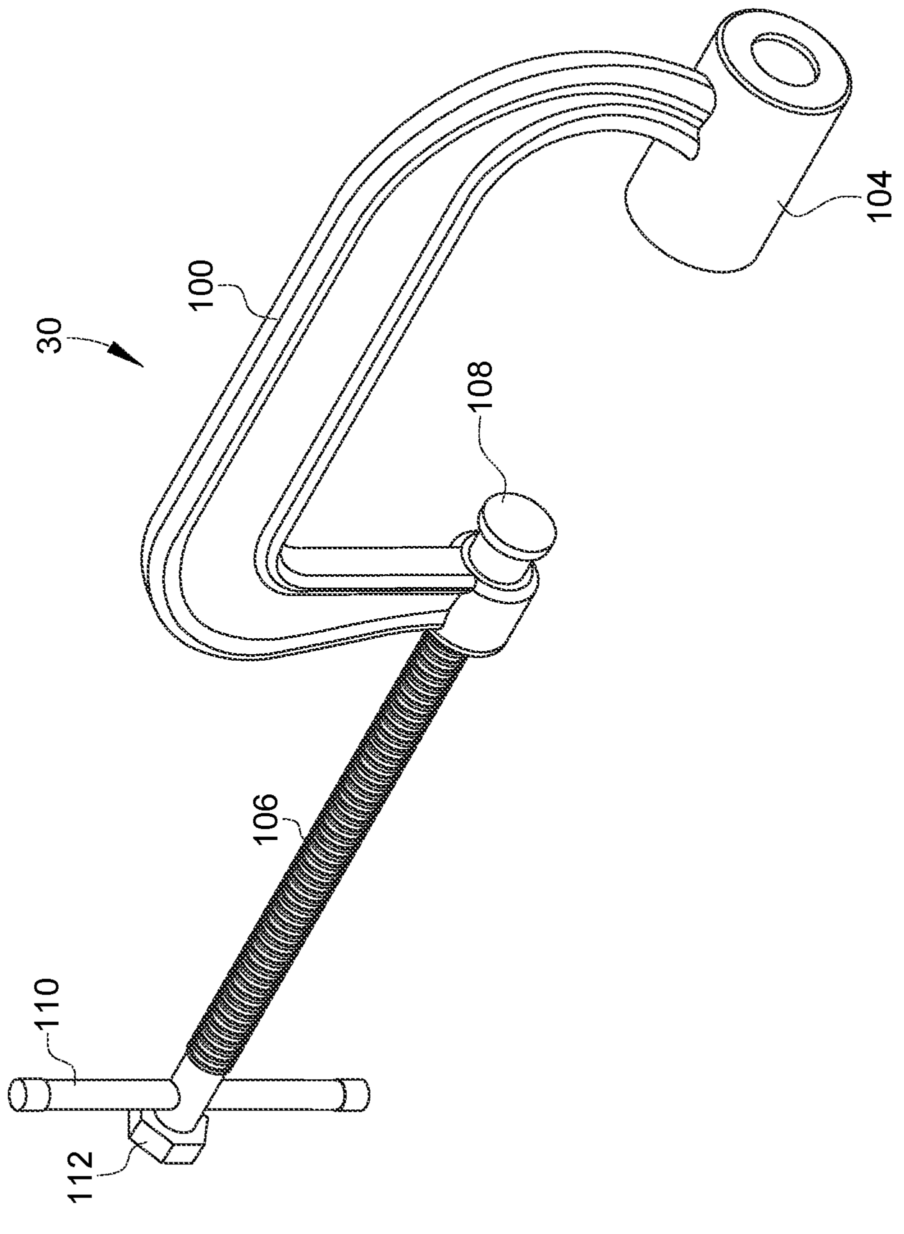
FIG. 4 is another isometric view of the adhesive dispensing assembly of FIG. 3.

Referring to FIGS. 3-5, the handle 110 is provided to allow a user to manually rotate the screw member 106. The handle 110 is coupled to the first end portion 231 of the screw member 106. In an exemplary embodiment, the plunger pad 108 is constructed of a metal.

Referring to FIGS. 1, 2, 5 and 12, the bolt head 112 is provided to allow a drill socket 40 to be coupled thereto which allows the electric drill 50 to rotate the drill socket 40 and the screw member 106 either in a first rotational direction to dispense the adhesive 71 from the adhesive holding cartridge 20 or in a second rotational direction to retract (rightwardly in FIG. 5) the slidable inner cap 76. The bolt head 112 is coupled to an end of the first end portion 231 of the screw member 106. The bolt head 112 includes first, second, third, fourth, fifth, and sixth side engagement surfaces 291, 292, 293, 294, 295, 296. In an exemplary embodiment, the bolt head 112 is constructed of a metal.

Referring to FIGS. 1, 2 and 5, the drill socket 40 is operably coupled to the electric drill 50. The drill socket 40 is further coupled to the bolt head 112 to rotate the bolt head 112 in either the first rotational direction or the second rotational direction. In an alternate embodiment, the electric drill 50 is replaced with a socket wrench (not shown) that is operably coupled to the bolt head 112 to rotate the bolt head 112 in either the first rotational direction or the second rotational direction.

Referring to FIGS. 1-15, a flowchart of a method for dispensing the adhesive 71 from the adhesive holding cartridge 20 in accordance with another exemplary embodiment will now be explained.

At step 320, the user provides an adhesive holding cartridge 20 having a cartridge body 70 holding an adhesive 71 therein, a dispensing tip 72 coupled to the cartridge body 70, and a slidable inner cap 76 disposed in the cartridge body 70 communicating with the adhesive 71.

At step 322, the user provides an adhesive dispensing assembly 30 having a U-shaped frame 100, a screw receiving portion 102, a cartridge holding portion 104, a screw member 106, a plunger pad 108, a handle 110, and a bolt head 112. The U-shaped frame 100 has a first end portion 141 and a second end portion 142. The screw receiving portion 102 is coupled to the first end portion 141 of the U-shaped frame 100. The screw receiving portion 102 has a threaded aperture 160 (shown in FIG. 7) extending therethrough. The cartridge holding portion 104 is coupled to the second end portion 142 of the U-shaped frame 100. The cartridge holding portion 104 has a tubular wall 180 and a ring-shaped wall 182. The tubular wall 180 has a first end 191, a second end 192, and a groove 196 extending through the tubular wall 180 from the first end 191 toward the second end 192. The ring-shaped wall 182 is coupled to the second end 192 of the tubular wall 180. The first end 191 defines a receiving aperture 198 (shown in FIG. 7). The screw member 106 has a first end portion 231, a central portion 233, and a second end portion 232. The central portion 233 is coupled to and between the first and second end portions 231, 232 of the screw member 106. The central portion 233 is threadably received through the threaded aperture 160 of the screw receiving portion 102. The plunger pad 108 is coupled to the second end portion 232 of the screw member 106. The handle 110 is coupled to the first end portion 231 of the screw member 106. The bolt head 112 is coupled to an end of the first end portion 231 of the screw member 106.

At step 324, the user couples the adhesive holding cartridge 20 to the adhesive dispensing assembly 30 such that the dispensing tip 72 extends through an aperture 210 (shown in FIG. 7) in the ring-shaped wall 182 of the cartridge holding portion 104 and a portion of the cartridge body 70 is disposed in a region 199 defined by the tubular wall 180 of the cartridge holding portion 104.

At step 326, the user rotates the screw member 106 in a first rotational direction such that the plunger pad 108 contacts the slidable inner cap 76 disposed in the cartridge body 70.

At step 328, the user removes a tip portion of the dispensing tip 72.

At step 330, the user rotates the screw member 106 in the first rotational direction such that the plunger pad 108 moves the slidable inner cap 76 further into the cartridge body 70 such that the adhesive 71 is dispensed out of the dispensing tip 72.

At step 332, the user rotates the screw member 106 in a second rotational direction such that the plunger pad 108 is moved away from the slidable inner cap 76 and outside of the cartridge body 70.

At step 334, the user de-couples the adhesive holding cartridge 20 from the adhesive dispensing assembly 30 by removing the dispensing tip 72 from the aperture 210 in the ring-shaped wall 182 of the cartridge holding portion 104 and removing the cartridge body 70 from the region 199 defined by the tubular wall 180 of the cartridge holding portion 104.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. An adhesive dispensing assembly for holding an adhesive holding cartridge therein, comprising:

a U-shaped frame having a first end portion and a second end portion;

a screw receiving portion being coupled to the first end portion of the U-shaped frame, the screw receiving portion having a threaded aperture extending therethrough;

a cartridge holding portion being coupled to the second end portion of the U-shaped frame, the cartridge holding portion having a tubular wall and a ring-shaped wall, the tubular wall having a first end, a second end, and a groove extending through the tubular wall from the first end toward the second end, the ring-shaped wall being coupled to the second end of the tubular wall, the first end defining a receiving aperture;

a screw member having a first end portion, a central portion, and a second end portion; the central portion being coupled to and between the first and second end portions of the screw member, the central portion being threadably received through the threaded aperture of the screw receiving portion;

a plunger pad being coupled to the second end portion of the screw member;

a handle being coupled to the first end portion of the screw member; and a bolt head being coupled to an end of the first end portion of the screw member.

2. The adhesive dispensing assembly of claim 1, wherein:

a length of the screw member being greater than a length of a throat distance of the U-shaped frame.

3. The adhesive dispensing assembly of claim 1, wherein:

a diameter of the tubular wall of the cartridge holding portion being greater than a diameter of the adhesive holding cartridge.

4. The adhesive dispensing assembly of claim 1, wherein:

the plunger pad being rotatably coupled to the second end portion of the screw member.

5. The adhesive dispensing assembly of claim 1, wherein:

the plunger pad having a receiving aperture extending therein; and the second end portion of the screw member being a ball portion that is disposed in the receiving aperture of the plunger pad.

6. The adhesive dispensing assembly of claim 1, wherein:

the bolt head having first, second, third, fourth, fifth, and sixth side engagement surfaces.

7. An adhesive dispensing assembly for holding an adhesive holding cartridge therein, comprising:

a U-shaped frame having a first end portion and a second end portion;

a screw receiving portion being coupled to the first end portion of the U-shaped frame, the screw receiving portion having a threaded aperture extending therethrough;

a cartridge holding portion being coupled to the second end portion of the U-shaped frame, the cartridge holding portion having a tubular wall and a ring-shaped wall, the tubular wall having a first end, a second end, and a groove extending through the tubular wall from the first end toward the second end, the ring-shaped wall being coupled to the second end of the tubular wall, the first end defining a receiving aperture;

a screw member having a first end portion, a central portion, and a second end portion; the central portion being coupled to and between the first and second end portions of the screw member, the central portion being threadably received through the threaded aperture of the screw receiving portion;

a plunger pad being coupled to the second end portion of the screw member; and a handle being coupled to the first end portion of the screw member.

8. The adhesive dispensing assembly of claim 7, wherein:

a length of the screw member being greater than a length of a throat distance of the U-shaped frame.

9. The adhesive dispensing assembly of claim 7, wherein:

a diameter of the tubular wall of the cartridge holding portion being greater than a diameter of the adhesive holding cartridge.

10. The adhesive dispensing assembly of claim 7, wherein:

the plunger pad being rotatably coupled to the second end portion of the screw member.

11. The adhesive dispensing assembly of claim 7, wherein:

the plunger pad having a receiving aperture extending therein; and the second end portion of the screw member being a ball portion that is disposed in the receiving aperture of the plunger pad.

12. An adhesive dispensing assembly for holding an adhesive holding cartridge therein, comprising:

a U-shaped frame having a first end portion and a second end portion;

a screw receiving portion being coupled to the first end portion of the U-shaped frame, the screw receiving portion having a threaded aperture extending therethrough;

a cartridge holding portion being coupled to the second end portion of the U-shaped frame, the cartridge holding portion having a tubular wall and a ring-shaped wall, the tubular wall having a first end, a second end, and a groove extending through the tubular wall from the first end toward the second end, the ring-shaped wall being coupled to the second end of the tubular wall, the first end defining a receiving aperture;

a screw member having a first end portion, a central portion, and a second end portion; the central portion being coupled to and between the first and second end portions of the screw member, the central portion being threadably received through the threaded aperture of the screw receiving portion;

a plunger pad being coupled to the second end portion of the screw member; and a bolt head being coupled to an end of the first end portion of the screw member.

13. The adhesive dispensing assembly of claim 12, wherein:

a length of the screw member being greater than a length of a throat distance of the U-shaped frame.

14. The adhesive dispensing assembly of claim 12, wherein:

a diameter of the tubular wall of the cartridge holding portion being greater than a diameter of the adhesive holding cartridge.

15. The adhesive dispensing assembly of claim 12, wherein:

the plunger pad being rotatably coupled to the second end portion of the screw member.

16. The adhesive dispensing assembly of claim 12, wherein:

the plunger pad having a receiving aperture extending therein; and the second end portion of the screw member being a ball portion that is disposed in the receiving aperture of the plunger pad.

17. The adhesive dispensing assembly of claim 12, wherein:

the bolt head having first, second, third, fourth, fifth, and sixth side engagement surfaces.

* * * * *